(12) United States Patent
Jourdan

(10) Patent No.: US 6,848,031 B2
(45) Date of Patent: Jan. 25, 2005

(54) PARALLEL SEARCHING FOR AN INSTRUCTION AT MULTIPLE CACHE LEVELS

(75) Inventor: Stephan Jourdan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 10/033,112

(22) Filed: Jan. 2, 2002

(65) Prior Publication Data

US 2003/0126366 A1 Jul. 3, 2003

(51) Int. Cl.$^7$ .............................................. G06F 12/08
(52) U.S. Cl. ..................... 711/137; 711/119; 711/120; 711/122; 711/125; 711/150; 711/168
(58) Field of Search .............................. 711/119, 120, 711/122, 125, 137, 150, 168

(56) References Cited

U.S. PATENT DOCUMENTS 6,119,222 A * 9/2000 Shiell et al. ................ 712/238

* cited by examiner

Primary Examiner—Jack Lane
(74) Attorney, Agent, or Firm—B. Delano Jordan

(57) ABSTRACT

A system and method of fetching processor instructions provides enhanced performance. The method and system provide for receiving a request for an instruction, and searching a cache system at a first level for the instruction. The cache system is searched at a second level for the instruction in parallel with the first level based on a prediction of whether the instruction will be found at the first level.

26 Claims, 5 Drawing Sheets

PARALLEL SEARCHING FOR AN INSTRUCTION AT MULTIPLE CACHE LEVELS

BACKGROUND OF THE INVENTION

1. Technical Field

The present invention generally relates to the fetching of processor instructions. More particularly, the invention relates to the searching of multiple cache levels in parallel.

2. Discussion

In the highly competitive computer industry, the trend toward higher processing speeds and increased functionality is well documented. While this trend is desirable to the consumer, it presents significant challenges to processor designers as well as manufacturers. A particular area of concern relates to the fetching of instructions for execution. For example, as the ability of processors to execute instructions rapidly increases, it has been determined that many conventional approaches to providing instructions to the execution core fail to fully address the increase.

Traditionally, an instruction supply engine provides decoded instructions to an execution core, which is capable of generating feedback signals to assist in the instruction fetching process. For example, in certain instances a branch misprediction signal is generated in response to the receipt of one or more instructions that do not correspond to the execution path of the program code. In such case, a front end re-start must be implemented in order to "realign" the instruction supply engine with the program code.

FIGS. 5 and 6 illustrate that the typical instruction supply engine 20 has a decoder 24 and a cache system, which is made up of one or more cache levels. For example, the first level might be a trace cache 26, which stores micro-operations (pops) in traces that correspond to various paths through the logic of the program code. While trace caches are relatively new to processor architectures, trace based instruction caching has been well documented in a number of sources such as U.S. Pat. No. 6,170,038 to Krick et al. The trace cache 26 is typically located between the decoder 24 and the execution core 27, and can generally be accessed at full processor speed. On the other hand, the second level of the cache system, such as the instruction cache 22, is often located between the decoder 24 and the remainder of the front end, which includes main memory 29. Although a conventional instruction cache 22 is larger than the trace cache 26, the speed at which the instruction cache 22 can be accessed is generally slower.

Turning now to FIG. 1, it can be seen that the conventional approach to fetching processor instructions is serial in nature. For example, in response to a front end restart at block 10, the first level of the cache system is searched at block 12. If it is determined at block 14 that cache miss has occurred, the method provides for searching the next level at block 16. It can be seen that the levels of cache system are sequentially searched until the instruction is found, and the instruction is processed at block 18. As best shown in FIG. 6, there is significant room for improvement with regard to the above-described approach. Specifically, in the event of a cache miss in the trace cache 26, the search of the instruction cache 22 begins after it is determined that a cache miss occurred in the trace cache 26. Thus, a pipeline (or "pipe") delay of approximately five stages is added to the twenty stage pipeline delay associated with obtaining the instruction from the instruction cache 22 and the decoder 24. In the illustrated example a total delay of 25 pipeline stages results. It should be noted that the specific delay values are used for discussion purposes only. Power consumption is also an issue of concern.

BRIEF DESCRIPTION OF THE DRAWINGS

The various advantages of the present invention will be apparent to one skilled in the art by reading the following specification and appended claims, and by referencing the following drawings, in which:

DETAILED DESCRIPTION

Figure 1:
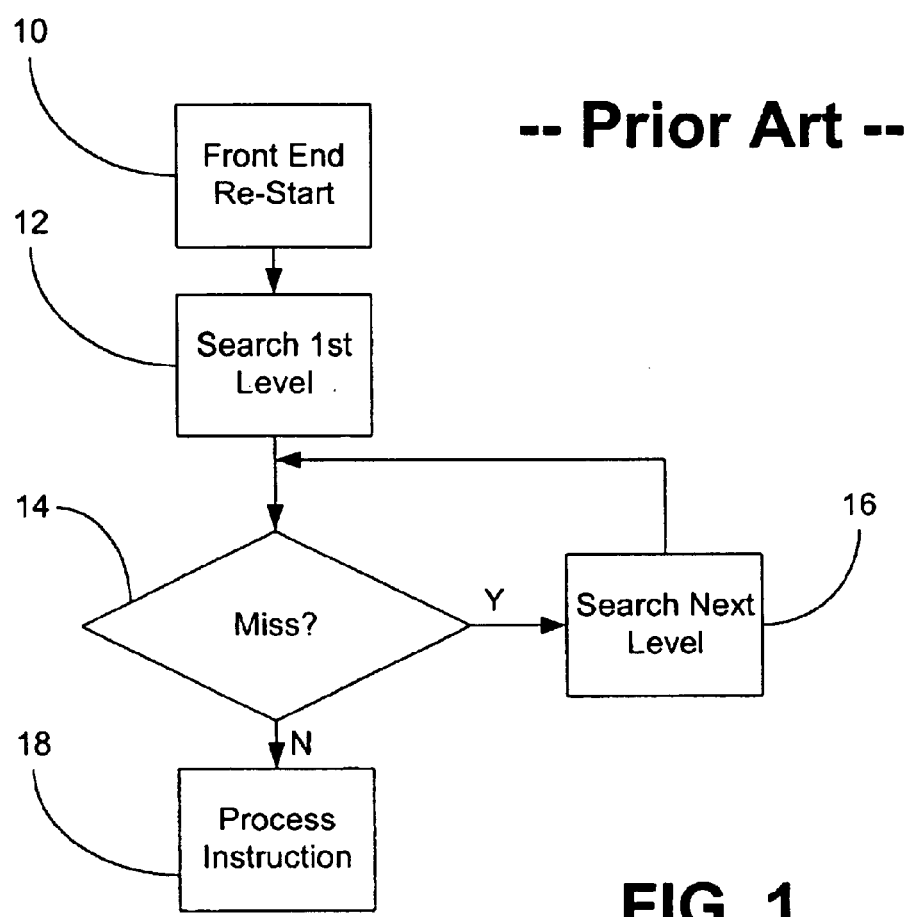
FIG. 1 is a flowchart of an example of a conventional approach to fetching processor instructions, useful in understanding the invention.
Figure 2:
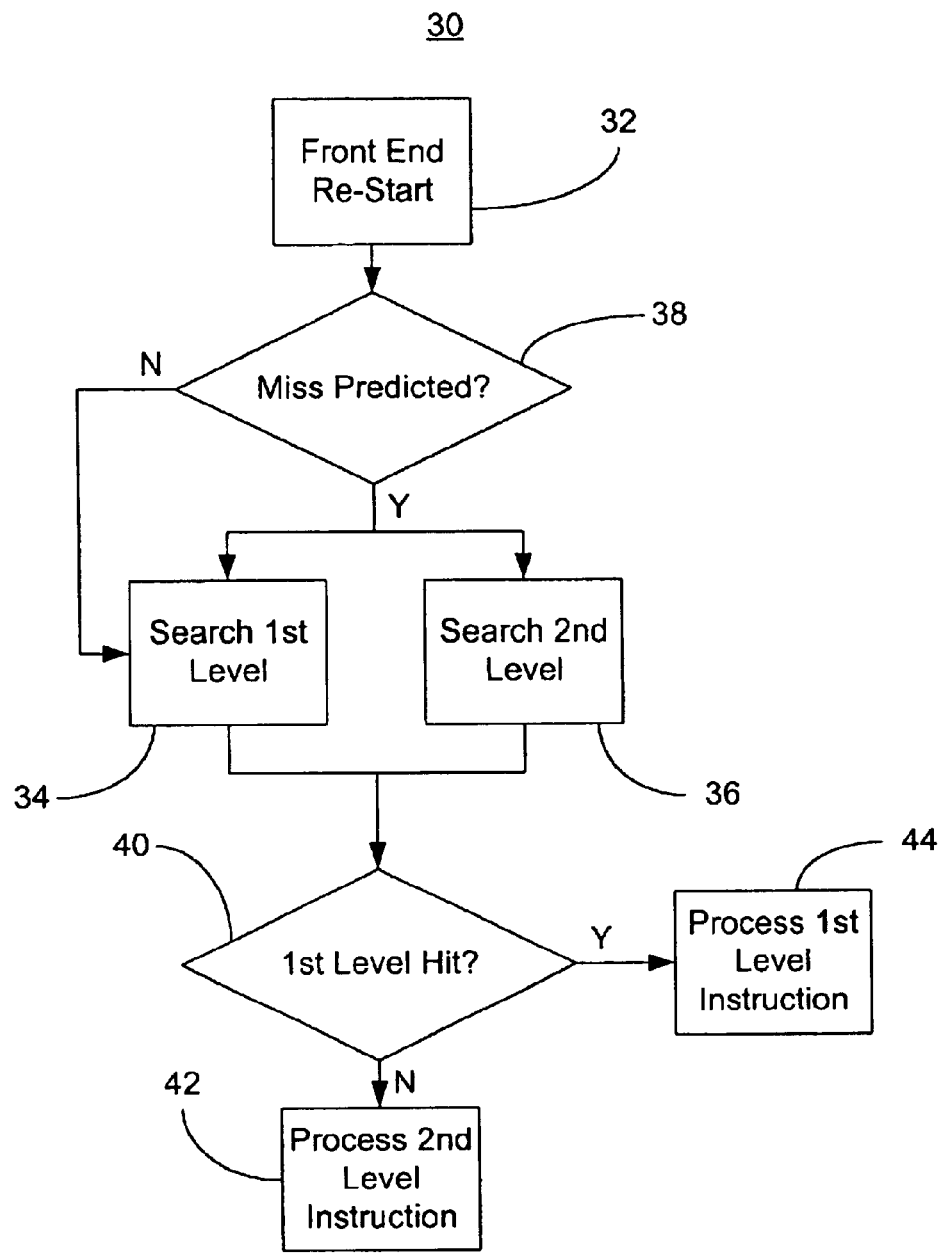
FIG. 2 is a flowchart of an example of a method of fetching processor instructions in accordance with one embodiment of the present invention.

Turning now to FIG. 2, a method 30 of fetching processing instructions is shown. Generally, a request for an instruction is received at processing block 32, where the instruction implements a front end re-start. Front end re-starts typically occur after a branch misprediction, wherein it is necessary to "realign" the instruction supply engine with the program code. The execution core reports the branch miss prediction back to the instruction supply engine in the form of a command such as "jump-execution-clear" (jeclear). The instruction supply engine must then retrieve instructions from the cache system in order to keep the execution core as busy as possible, and avoid "bubbles" in the instruction pipeline. Thus, when the instruction request is received, processing block 34 provides for searching the cache system at a first level for the instruction. It can further be seen that the cache system is searched at a second level for the instruction in parallel with the first level at block 36 based on a prediction of whether the instruction will be found at the first level. Thus, if it is determined at block 38 that a miss is likely to occur at the first level of the cache system, the parallel search is executed. Otherwise, the traditional serial approach to fetching instructions is followed. Processing block 40 therefore determines whether a hit occurred at the first level. It will be appreciated that in the case of a parallel search, the expected answer to the determination at block 40 is "No". In such case, the instruction obtained from the second level of the cache system at block 36 is processed at block 42. If a parallel search was performed based on an incorrect prediction of a miss at the first level, the result of the determination at block 40 will be "Yes", and the instruction obtained from the first level is processed at block 44.

It is important to note that since the time required to search the first level is significantly shorter than the time required to search the second level, the second level search at block 36 can be discontinued as soon as the instruction is found at the first level in the case of an incorrect miss prediction. It should also be noted that in the event of an incorrect prediction that a miss will not occur (i.e., the parallel search is not performed), block 42 includes an additional search of the second level before the second level instruction can be processed. It will be appreciated, however, that such a result is in accordance with conventional approaches and constitutes no additional delay or depletion of processing resources.

Figure 7:
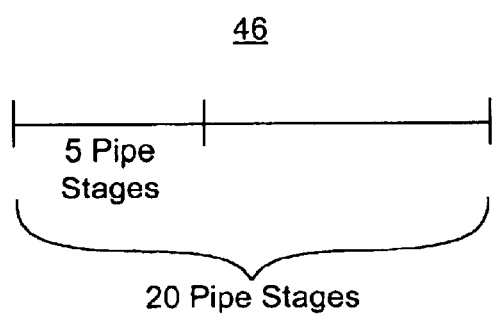
FIG. 7 is a diagram of an example of pipeline delay in accordance with one embodiment of the present invention.

The benefits associated with the above-described approach are best seen in FIG. 7 at timing diagram 46. Specifically, it can be seen that when a miss at the first level is predicted, the overlap between the first level search and the second level search results in an overall delay reduction of five pipeline stages. It is important to note that the values used herein are for discussion purposes only, and that the invention is not limited to any specific delay figures. In fact, the principles described herein are readily applicable to any processor architecture in which pipeline delay or power consumption are issues of concern.

Figure 3:
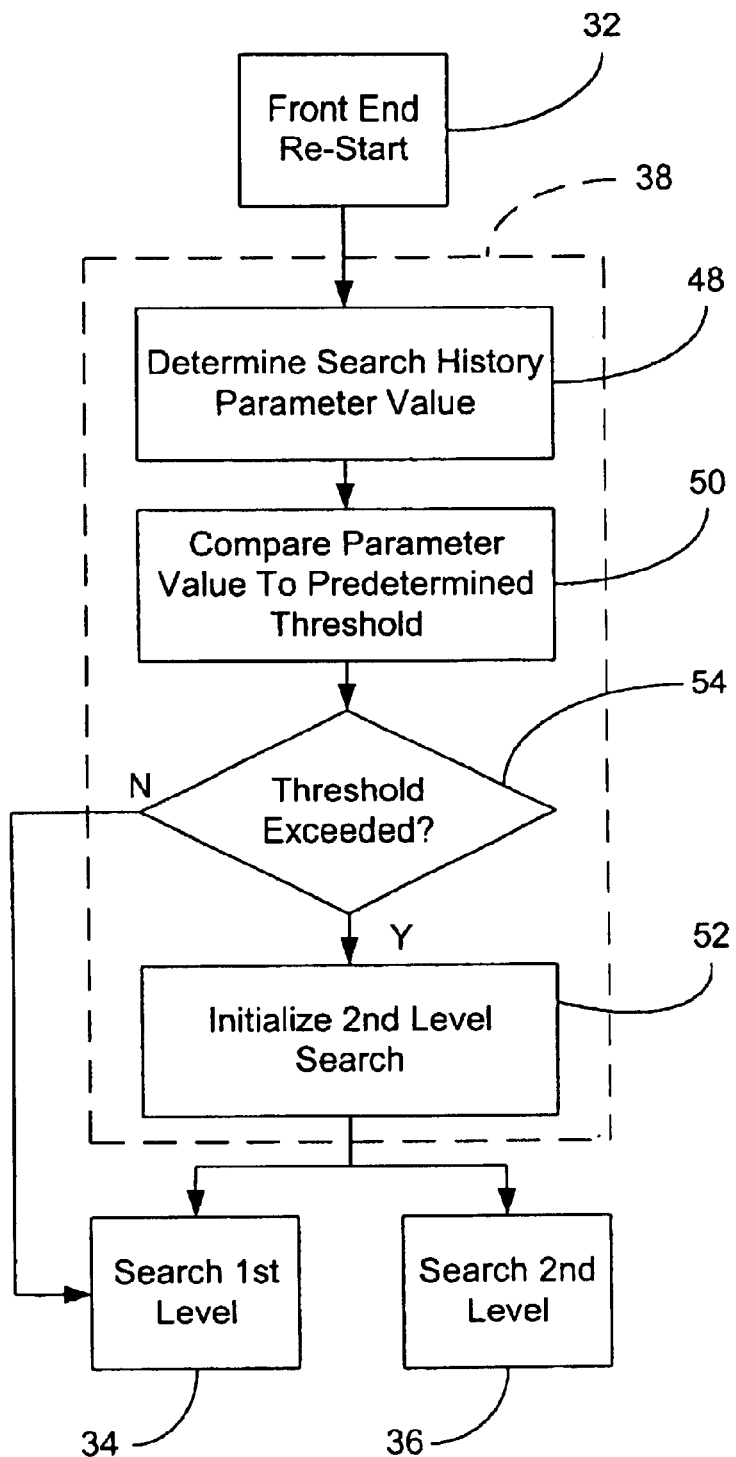
FIG. 3 is a flowchart of an example of a method of predicting a trace cache miss in accordance with one embodiment of the present invention.

Turning now to FIG. 3, one approach to predicting first level misses is shown at block 38 in greater detail. Specifically, block 48 provides for determining a parameter value corresponding to a first level search history for the instruction. For example, the instruction "jeclear", which typically leads to a front end re-start, might have a search history that indicates how often a first level search for the jeclear instruction has resulted in a miss. Block 50 provides for comparing the parameter value to a predetermined threshold. Thus, if the threshold is one miss out of the last three searches for the requested instruction, a comparison between the current number of misses and the threshold of one is made at block 50. The search of the cache system at the second level is initialized at block 52 if it is determined at block 54 that the parameter value exceeds the predetermined threshold.

Figure 4:
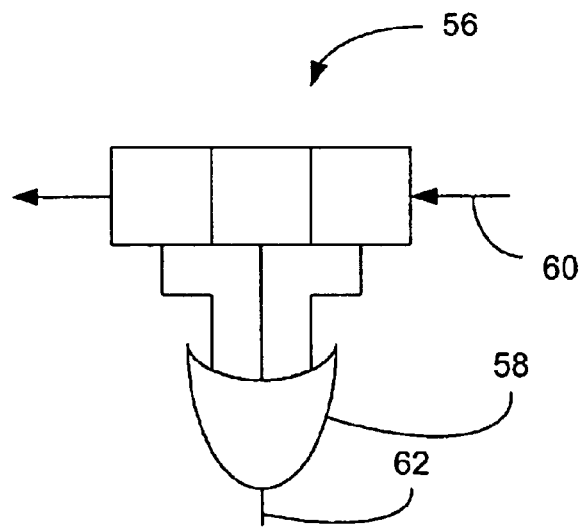
FIG. 4 is a schematic diagram of an example of a hardware implementation of an approach to predicting whether an instruction will be found at the first level in accordance with one embodiment of the present invention.

FIG. 4 demonstrates a hardware implementation of processing blocks 48, 50 and 54 (FIG. 3), in which a shift register 56 and an OR gate 58 track a number of cache misses for a predetermined number of cache searches corresponding to the instruction. In the illustrated embodiment, the three most recent results of search history signal 60 are stored in the shift register 56 and fed to the OR gate 58. Thus, if any of the stored results indicates a cache miss, the output 62 of OR gate 58 will signal that a cache miss is expected at the next occurrence of the given instruction. The hardware implementation therefore provides for the initialization of the search of the cache system at the second level when the number of cache misses for the predetermined number of cache searches is greater than zero.

Figure 5:
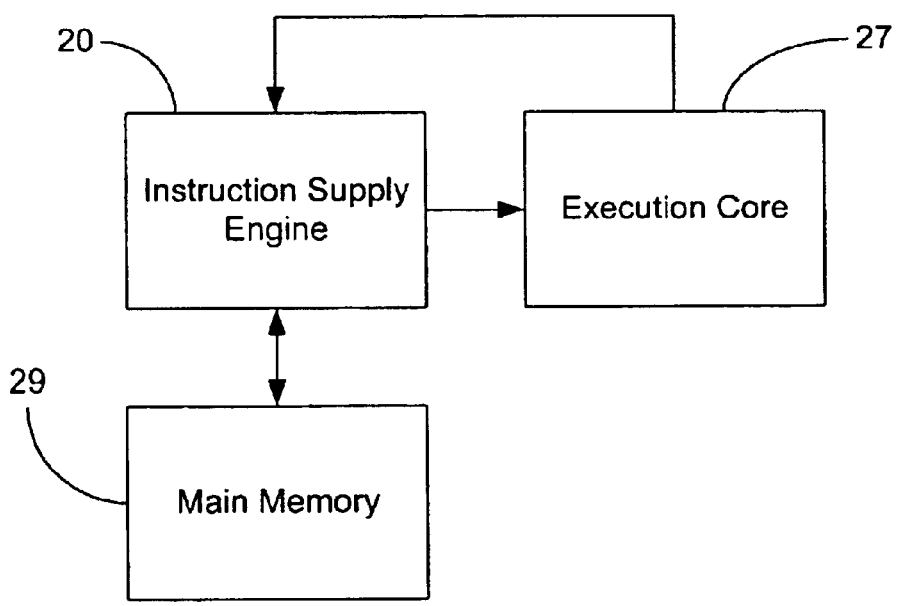
FIG. 5 is a block diagram of an example of a processor front end in accordance of one embodiment of the present invention.
Figure 6:
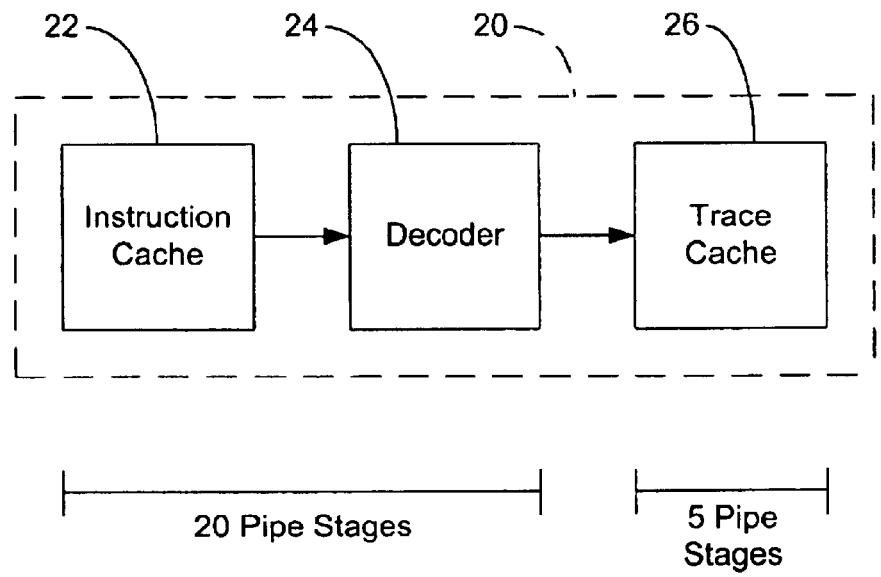
FIG. 6 is a block diagram of an example of conventional pipeline delay, useful in understanding the invention.

With continuing reference to FIGS. 4–6, it will be appreciated that the illustrated hardware implementation can be included in the instruction supply engine 20 in any number of ways. For example, the shift register 56 and/or gate 58 can be incorporated with the control logic of the decoder 24. Alternatively, the components can be incorporated into the trace cache 26, instruction cache 22, or a stand-alone module. It is also important to note that other hardware and/or software variations are also possible, and that the principles described herein are not limited to the particular components illustrated.

Notwithstanding, the illustrated shift register 56 and OR gate 58 are implemented as part of the cache system to facilitate storage and retrieval of the parameter value. It should also be pointed out that although it is preferred that the first level of the cache system includes a trace cache 26 and that the second level of the cache system includes an instruction cache 22, other configurations are possible. For example, in systems where a trace cache is not employed, the first level might represent the instruction cache 22, and the second level might represent the main memory 29.

In addition to the already discussed time savings, the above method and system do not cause problems with regard to hyper-threading. Hyper-threading technology enables a single physical processor to execute two separate code streams (or threads) concurrently. Architecturally, a processor with hyper-threading technology includes two logical processors, each of which having its own architectural state. The architectural state that is duplicated for each logical processor includes data registers, segment registers, control registers, debug registers, and many of the shift registers. Each logical processor also has its own advanced programmable interrupt controller (APIC), not shown. After power up and initialization, each logical processor can be individually halted, interrupted, or directed to execute a specific thread, independently from the other logical processor on the chip. Unlike a traditional dual processor (DP) configuration that uses two separate physical processors, the logical processors in a processor with hyper-threading technology share the execution resources of the processor core. These execution resources include the execution engine, the caches, the system bus interface, and the firmware. By enabling faster recovery from branch mispredictions through parallel searching, the above method and system enhance the performance benefits achievable through hyper-threading.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

I claim:

1. A method of fetching processor instructions, the method comprising:

receiving a request for an instruction;

searching a cache system at a first level for the instruction; and searching the cache system at a second level for the instruction in parallel with the first level based on a prediction of whether the instruction will be found at the first level.

2. The method of claim 1 further including:

determining a parameter value corresponding to a first level search history for the instruction;

comparing the parameter value to a predetermined threshold; and initializing the search of the cache system at the second level if the parameter value exceeds the predetermined threshold.

3. The method of claim 2 further including determining a cache miss value corresponding to the first level search history.

4. The method of claim 3 further including tracking a number of cache misses for a predetermined number of cache searches corresponding to the instruction.

5. The method of claim 4 further including initializing search of the cache system at the second level if the number cache misses for the predetermined number of cache searches is greater than zero.

6. The method of claim 2 further including storing the parameter value to a computer readable storage medium.

7. The method of claim 6 further including storing the parameter value in the cache system.

8. The method of claim 2 further including retrieving the parameter value from a computer readable storage medium.

9. The method of claim 8 further including retrieving the parameter value from the cache system.

10. The method of claim 1 further including receiving a front end re-start instruction.

11. The method of claim 1 further including searching the cache system at a trace cache level for the instruction, the trace cache level being the first level of the cache system.

12. The method of claim 1 further including searching an instruction cache for the instruction, the instruction cache being the second level of the cache system.

13. The method of claim 1 further including searching the cache system at a main memory level for the instruction, the main memory level being the second level of the cache system.

14. The method of claim 1, further including fetching the instruction from the second level if the instruction is found at the second level and the instruction is not found at the first level, decoding the instruction and providing the decode instruction to an execution core.

15. A method of searching a cache system at a second level, the method comprising:

determining a parameter value corresponding to a first level search history for an instruction;

comparing the parameter value to a predetermined threshold; and initializing a search of the cache system at the second level if the parameter value exceeds the predetermined threshold, wherein the search for the instruction at the second level is to be conducted in parallel with a search of the cache system for the instruction at the first level.

16. The method of claim 15 further including determining a cache miss value corresponding to the first level search history.

17. The method of claim 16 further including tracking a number of cache misses for a predetermined number of cache searches corresponding to the instruction.

18. The method of claim 16 further including initializing the search of the cache system at the second level if the number cache misses for the predetermined number of cache searches is greater than zero.

19. The method of claim 16 further including storing the parameter value to a computer readable storage medium.

20. The method of claim 16 further including retrieving the parameter value from a computer readable storage medium.

21. A computer readable storage medium storing a set of instructions capable of being executed by a processor to:

receive a request for an instruction;

search a cache system at a first level for the instruction; and search the cache system at a second level for the instruction in parallel with the first level based on a prediction of whether the instruction will be found at the first level.

22. The storage medium of claim 21 wherein the set of instructions are further capable of being executed by the processor to:

determine a parameter value corresponding to a first level search history for the instruction;

compare the parameter value to a predetermined threshold; and initiate the search of the cache system at the second level if the parameter value exceeds the predetermined threshold.

23. The storage medium of claim 21, wherein the set of instructions are further capable of being executed to:

fetch the instruction from the second level if the instruction is found at the second level and the instruction is not found at the first level;

decode the instruction; and provide the decoded instruction to an execution core.

24. A processor instruction management system comprising:

an instruction supply engine having a cache system, the supply engine to generate a decoded instruction based on a request for the decoded instruction; and an execution core to execute the decoded instruction, the instruction supply engine to search the cache system at a first level for the instruction and to search the cache system at a second level for the instruction in parallel with the first level based on a prediction of whether the instruction will be found at the first level.

25. The instruction management system of claim 24 wherein the instruction supply engine further includes:

a shift register to receive a first level search history signal for the instruction, the signal defining a number of cache misses for a predetermined number of cache searches corresponding to the instruction; and an OR gate coupled to the shift register, the OR gate generating a miss prediction signal if the number of cache misses for the predetermined number of cache searches is greater than zero.

26. The instruction management system of claim 25 wherein the shift register has three data outputs, the predetermined number of cache searches to be three.

* * * * *

UNITED STATES PATENT AND TRADEMARK OFFICE
CERTIFICATE OF CORRECTION

PATENT NO. : 6,848,031 B2
DATED : January 25, 2005
INVENTOR(S) : Jourdan

It is certified that error appears in the above-identified patent and that said Letters Patent is hereby corrected as shown below:

<u>Column 5,</u>
Line 24, delete "decode" and insert -- decoded --.

Signed and Sealed this

Tenth Day of May, 2005

JON W. DUDAS
*Director of the United States Patent and Trademark Office*